(12) United States Patent
Romesburg et al.

(10) Patent No.: US 6,746,072 B1
(45) Date of Patent: Jun. 8, 2004

(54) VEHICLE LIFTGATE WITH ACCESSORY COMPONENT MODULE

(75) Inventors: William C. Romesburg, Troy, MI (US); Philippe Gougeon, Bloomfield Hills, MI (US); William Ethan A. McClure, Clawson, MI (US); Leonida S. Vaitus, Windsor (CA)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 10/360,220

(22) Filed: Jan. 31, 2003

(51) Int. Cl.$^7$ .................................................. B60J 5/10
(52) U.S. Cl. ................. 296/106; 296/96.17; 296/146.2; 296/146.8
(58) Field of Search .................... 296/96.15, 96.16, 296/96.17, 106, 146.2, 146.8, 146.1; 15/250.001, 250.3, 250.31

(56) References Cited

U.S. PATENT DOCUMENTS

| | | | | |
|---|---|---|---|---|
| 4,378,484 A | * | 3/1983 | Kunert | 219/203 |
| 5,035,449 A | * | 7/1991 | Shiratori et al. | 292/48 |
| 5,621,942 A | * | 4/1997 | Eustache et al. | 15/250.3 |
| 6,019,292 A | | 2/2000 | Walther | |
| 6,019,418 A | | 2/2000 | Emerling et al. | |
| 6,027,075 A | | 2/2000 | Petrenko | |
| 6,123,384 A | * | 9/2000 | Eustache et al. | 296/146.2 |
| 6,131,989 A | | 10/2000 | Montone et al. | |
| 6,234,564 B1 | | 5/2001 | Kim | |
| 6,240,593 B1 | * | 6/2001 | Murata | 15/250.3 |
| 6,416,106 B2 | | 7/2002 | Ponziani | |
| 6,435,596 B1 | | 8/2002 | Pyo | |
| 6,458,002 B1 | | 10/2002 | Buchanan, Jr. | |
| 6,493,900 B1 | * | 12/2002 | Koumo et al. | 15/250.3 |
| 6,523,882 B2 | | 2/2003 | Ishikawa et al. | |
| 6,557,205 B2 | * | 5/2003 | Ishikawa | 15/250.21 |

* cited by examiner

*Primary Examiner*—D. Glenn Dayoan
*Assistant Examiner*—Greg Blankenship
(74) *Attorney, Agent, or Firm*—J. Gordon Lewis (57) ABSTRACT

A liftgate component module mountable on a pivotal liftgate window provides a unitary mounting platform for a plurality of components including a window wiper drive apparatus and a window latch apparatus. A unitary bracket carries the wiper drive apparatus and the window latch apparatus. The bracket may be an integral extension of the wiper motor apparatus housing. Connections on the bracket mate with connectors carried on the liftgate window for securing the bracket to the liftgate window in a single assembly.

17 Claims, 7 Drawing Sheets

VEHICLE LIFTGATE WITH ACCESSORY COMPONENT MODULE

BACKGROUND

The present invention relates, in general, to motor vehicle liftgates or rear hatches and, more specifically, to accessory components mounted on such vehicle liftgate or rear hatches.

In modern vehicles, larger vehicles such as SUVs, vans and station wagons have a liftgate or rear hatch which closes a rear opening in the vehicle body. The liftgate is pivotally attached, usually by hinges, to the vehicle body structure surrounding the rear opening. The liftgate is releasably latchable to the vehicle structure by a latch mechanism so as to be movable between a closed position latched to the vehicle body structure and a pivoted, open position allowing access to the interior of the vehicle through the rear opening.

The liftgate itself is formed of a panel structure, which is stamped or otherwise formed into a panel having an upper opening for receiving a glass window. An interior trim panel is attachable to the liftgate panel to cover components mounted on the gate.

The liftgate forms a platform for a number of different accessories or components, such as a flipglass latch, a wiper motor and associated wiper arm, license plate lights, and a wash pump and/or wash nozzle. Various lights as well as the center high mounted stop light may also be mounted on the liftgate along with the liftgate latch mechanism. Other components which are usually mounted on the liftgate can include electrical contact connections to the defrost grid mounted on the liftgate glass or fiberglass.

All of these accessories or components are manufactured separately from the liftgate panel structure and are mounted, usually one at a time, on the liftgate while the vehicle is being assembled. The mounting of each component on the liftgate panel either directly or through brackets typically requires mechanical fasteners and, usually, an electrical connection via a plug-in connector, screw terminal, etc. All of the mounting procedures, and the mechanical and electrical connections require time, multiple workers and an increased length on the vehicle assembly line. In addition, although each component can be tested at its manufacturing site, the numerous multiple mechanical and electrical connections all create additional sources of defects which may require additional checking after assembly on the liftgate.

As can be seen, all of these factors lead to a substantial assembly time for the liftgate thereby resulting in a higher than desirable cost. To address these problems, a modular approach has been proposed in which several components are separably manufactured, pretested, and assembled into a single module, with only the module having to be mounted in a single operation on a liftgate. The number of separate mechanical fasteners and electrical connections can also be reduced by this modular approach. However, the modular approach has been proposed only for a limited number of components. This has resulted in less than anticipated savings in assembly time and labor.

Thus, it would be desirable to provide an improved modular component apparatus for vehicle liftgates in which multiple components are mounted in a single module for a single installation on the liftgate thereby improving reliability and reducing assembly costs. It would also be desirable to provide a modular component apparatus for a vehicle liftgate which has pre-aligned connection points, combined mounting points, and reduced weight which provides an increased glass viewing area.

SUMMARY

The present invention is a liftgate component module which is mountable on a vehicle liftgate window carried on a liftgate. The module includes a unitary bracket, a window wiper drive motor and a flip window latch apparatus mounted on the bracket, and means for mounting the bracket on the liftgate window.

In one aspect of the invention, the bracket is formed as an extension of a housing of the wiper motor drive apparatus.

The bracket includes first and second spaced legs extending from a central portion. Apertures are formed in each of the first and second legs. The window latch apparatus has first and second mounting flanges each carrying an aperture respectively alignable with the apertures in each of the first and second legs of the bracket for receiving fasteners fixed on the liftgate window therethrough.

In another aspect of the present invention, a vehicle liftgate is provided and includes a liftgate panel, a pivotal window mounted on the panel for movement between a first closed position and a second open position relative to the panel. The striker is carried on the liftgate panel. The liftgate window wiper drive apparatus and a liftgate window latch apparatus are unitarily mounted on a bracket for unitary one-step mounting on the liftgate window.

The liftgate mounted accessory module of the present invention provides many advantage over previously devised methods for mounting liftgate components on a liftgate or a liftgate window. First, the plurality of window mounted components are unitarily mounted on a bracket which is attachable to the liftgate window in a one-step mounting operation.

Further cost advantages and simplified assembly are obtained by providing the mounting bracket as an integral extension of the wiper drive motor housing. As both the wiper drive motor and the liftgate window latch apparatus may be unitarily coupled prior to mounting on the liftgate window, the number of electrical and mechanical connections are reduced and the reliability of the individual components increased since the components can be preassemble, prewired and tested, if desired, prior to mounting on the vehicle. The use of a single module to mount multiple components on the liftgate window also reduces the number of workers required in the vehicle assembly plant to install each component separately as well as reducing assembly line length required for the multiple component assembly operations and the time required for such assembly.

BRIEF DESCRIPTION OF THE DRAWING

The various features, advantages and other uses of the present invention will become more apparent by referring to the following detailed description and drawing in which.

DETAILED DESCRIPTION

Figure 1:
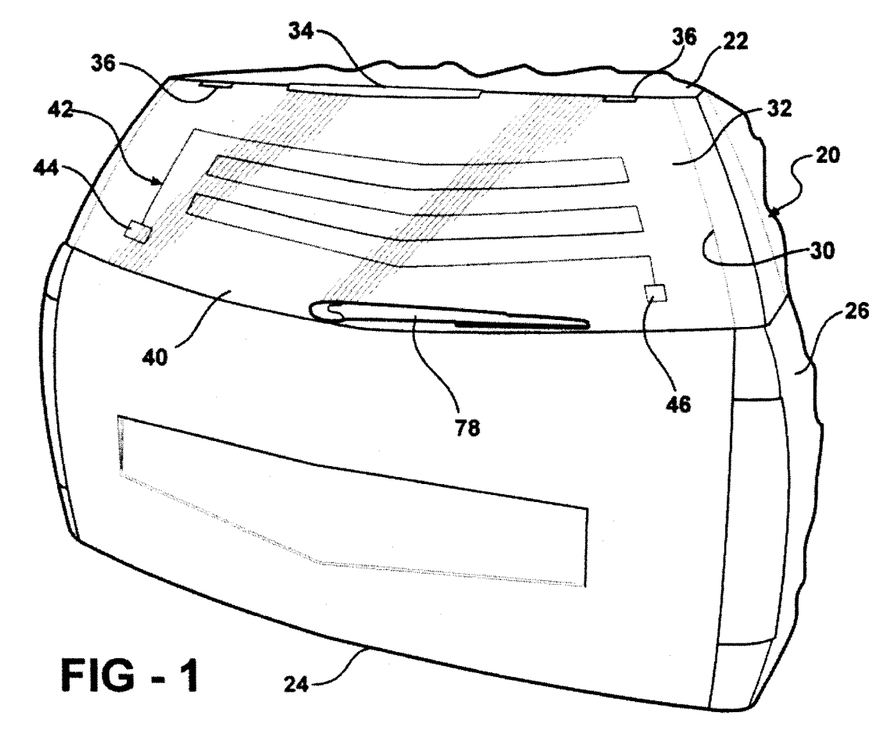
FIG. 1 is a front exterior elevational view of an exemplary vehicle liftgate utilizing the component module according to the present invention.
Figure 2:
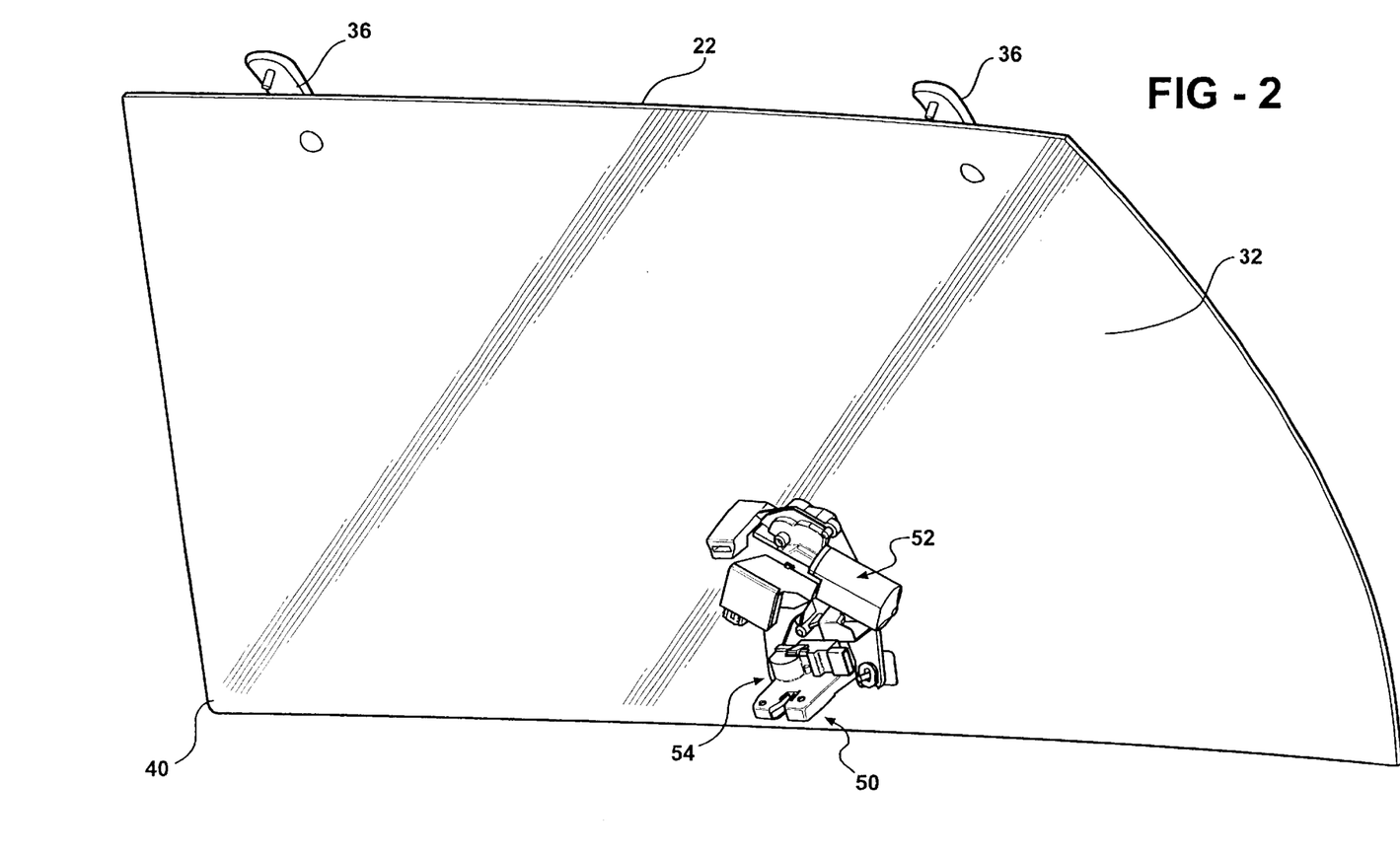
FIG. 2 is a perspective interior view of the inventive module shown mounted on the liftgate window.
Figure 3:
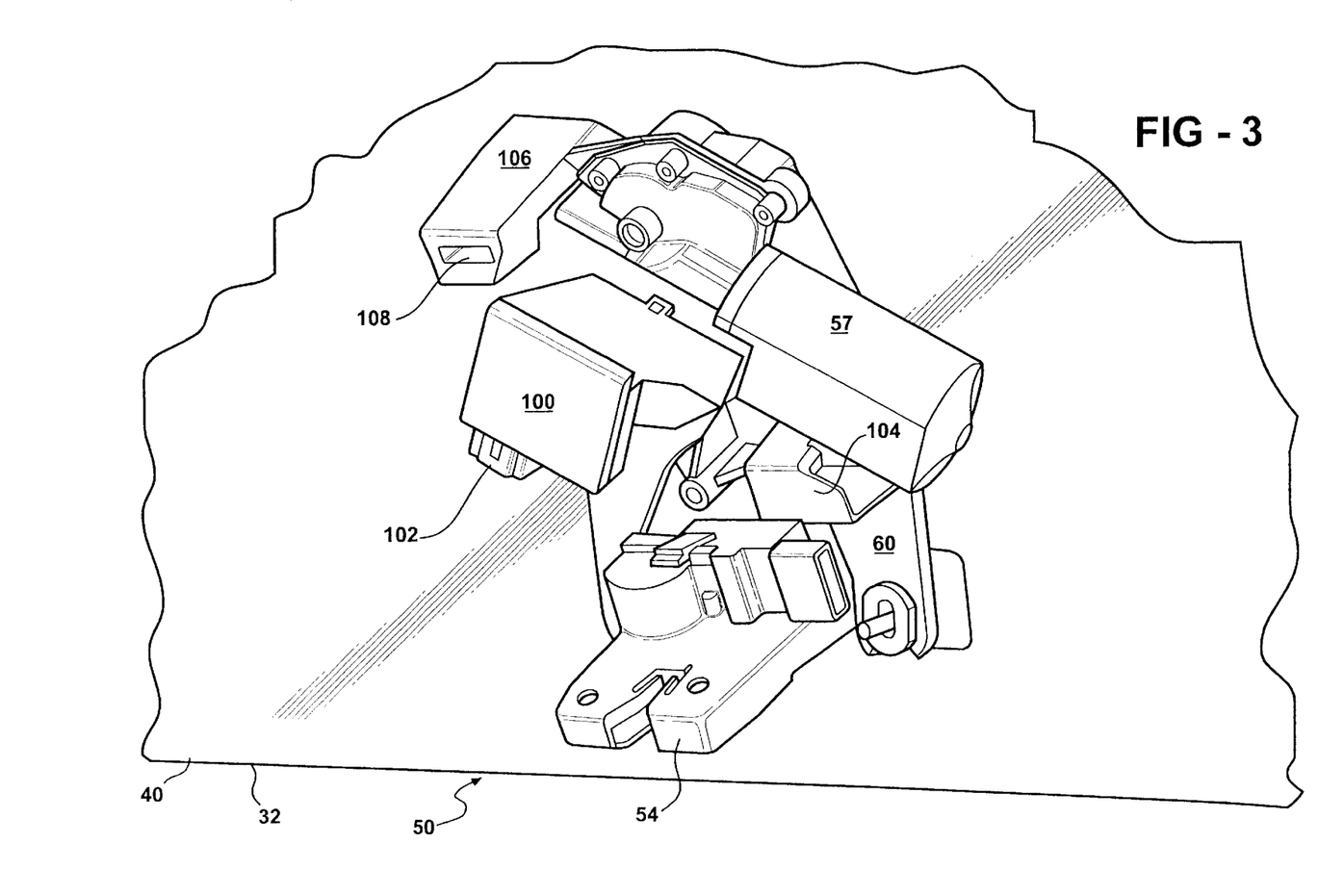
FIG. 3 is an enlarged, perspective view of the module shown in FIG. 2.
Figure 4:
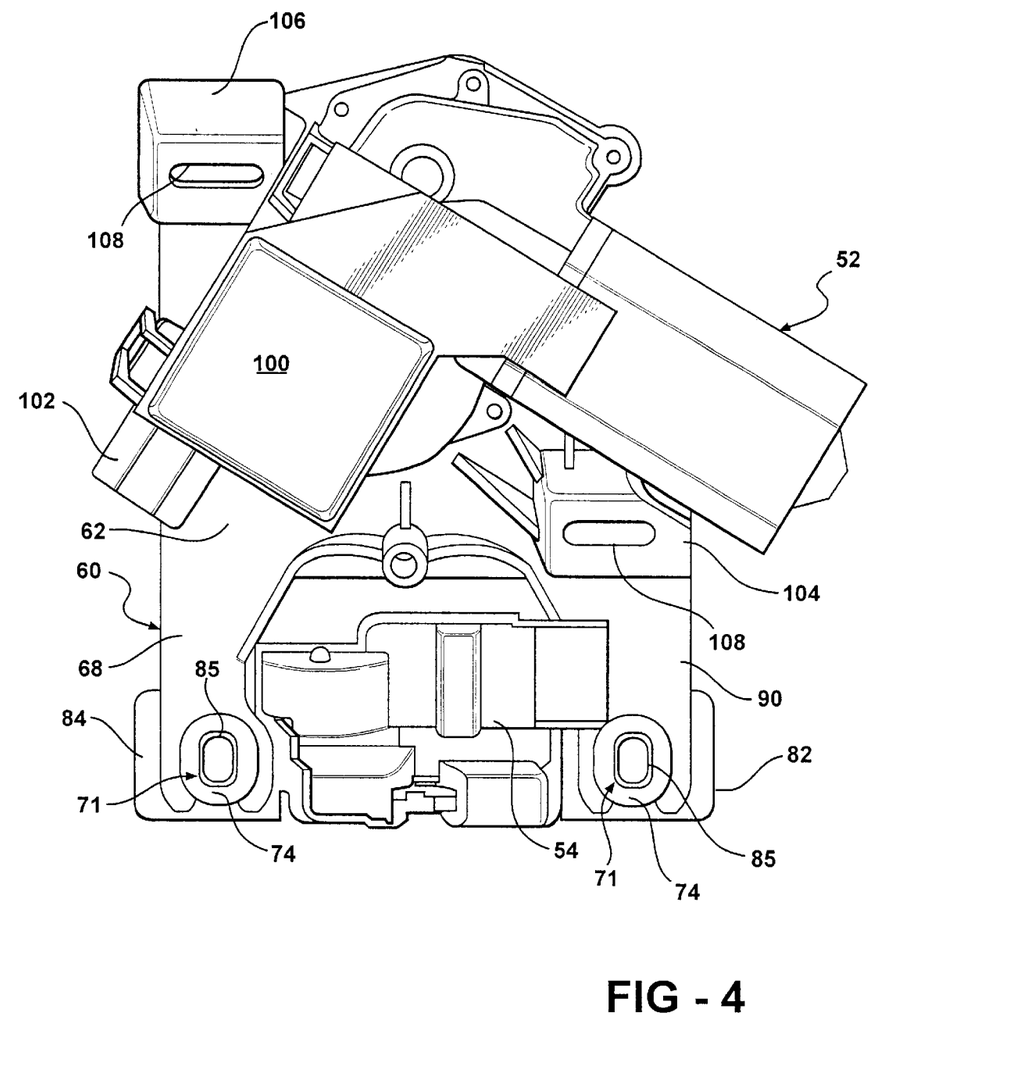
FIG. 4 is a front elevational view of the module shown in FIGS. 2 and 3.

Referring now to the drawing, and to FIG. 1 in general, there is depicted a pictorial representation of a motor vehicle liftgate or rear hatch 20. The shape of the liftgate 20 will vary from vehicle to vehicle.

The liftgate 20 is intended, by example only, to be articulated or pivoted about an upper generally horizontally extending edge 22 by means of hinges attached to the surrounding vehicle body structure, not shown. When the liftgate 20 is pivotally mounted about the upper edge 22, the latch means will normally be associated with an opposed bottom edge 24. The liftgate 20 may also be articulated to the vehicle body about a vertical axis on one of the lateral side edges, with the opposite lateral edge carrying a locking means for securing the liftgate 20 in a fixed position closing the rear opening in the vehicle.

The liftgate 20 may be formed using any conventional manufacturing process, such as an outer panel 26 which can be joined to an inner panel, not shown.

An aperture or opening 30 is formed in the liftgate 20. The aperture 30 is closed by a transparent panel, such as a glass window 32. The window 32 may be fixedly attached to the rear liftgate panel 26 or, articulated itself about an upper generally horizontally extending edge 34 to the upper edge portion of the liftgate 20 by means of one or more hinges 36 for pivotal movement of the opposed bottom end 40 between a closed position, sealed to the liftgate 20 and an open, pivotal position spaced from the adjacent portions of the outer liftgate panel 26.

As is common, a defrost grid 42 is mounted in or on the glass window 32. Opposed ends of the defrost grid 42 terminate in electrical connections or pads 44 and 46.

Any portion of the window 32 may be covered by an internally mounted plate or sheet, typically covering the defrost contact pads 44 and 46 as well as lateral or side portions to define a central transparent vision portion in the glass window 32.

Referring now to the drawing, and to FIGS. 2–6 in particular, there is depicted a module 50 which is mountable on the liftgate gate glass window 32, generally adjacent to the horizontally extending, lower edge 40. The module provide a unitary mounted platform for a plurality of liftgate associated components, such as, in the present example, a window 32 wiper drive motor 52 and a flip window latch unit 54.

Figure 5:
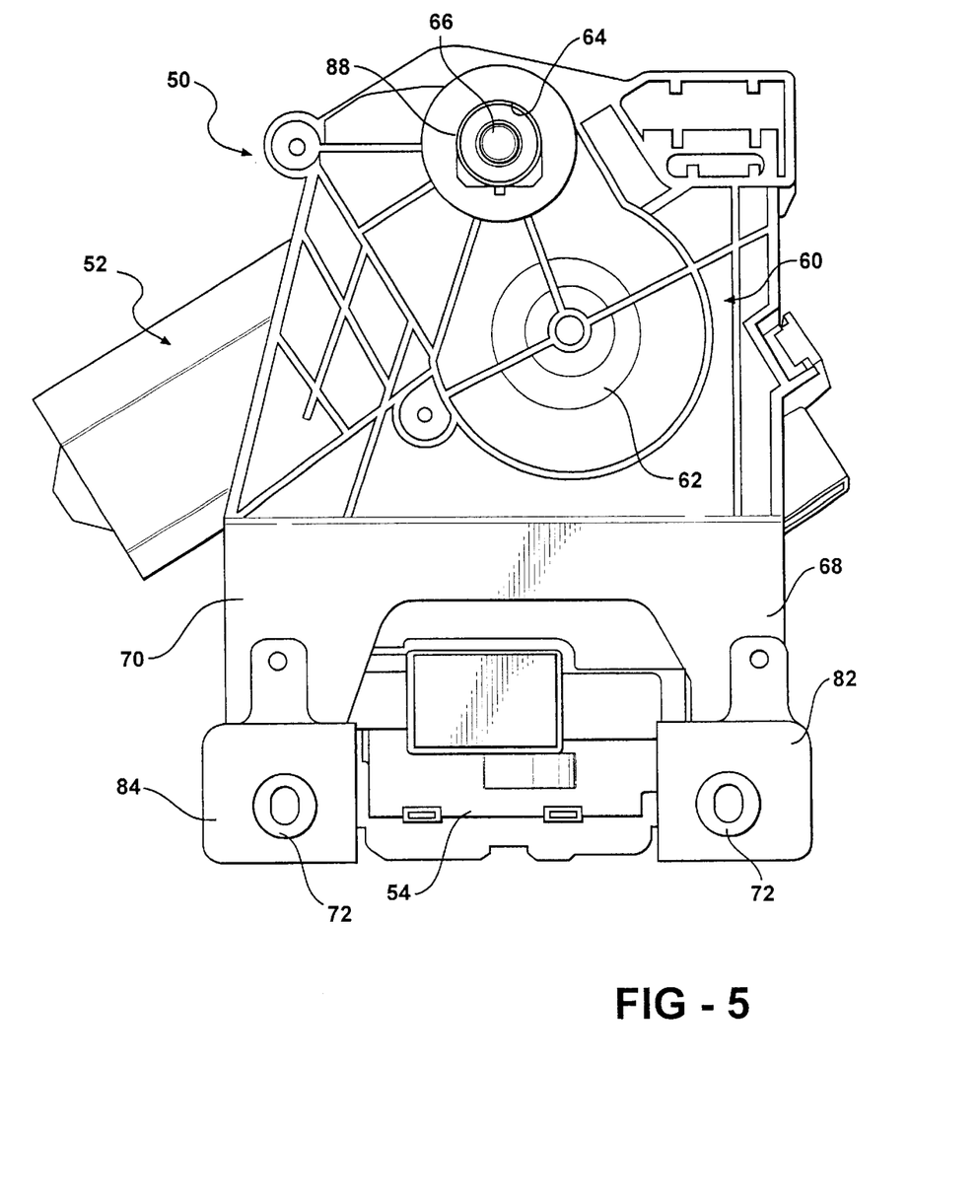
FIG. 5 is a rear elevational view of the module shown in FIG. 4.

The module 50 includes a first mounting bracket 60 which, while it could be constructed as a separate member attached to the wiper drive unit 52, in one aspect of the invention, the mounted bracket 60 is formed as a integral extension of the housing of the wiper motor unit 52. The bracket 60 includes a base portion 62 with an aperture 64 for receiving the wiper motor drive shaft 66 therethrough as shown in FIG. 5. A pair of legs 68 and 70 depend from the base 62 and are spaced apart by an open-ended slot 74.

Figure 6:
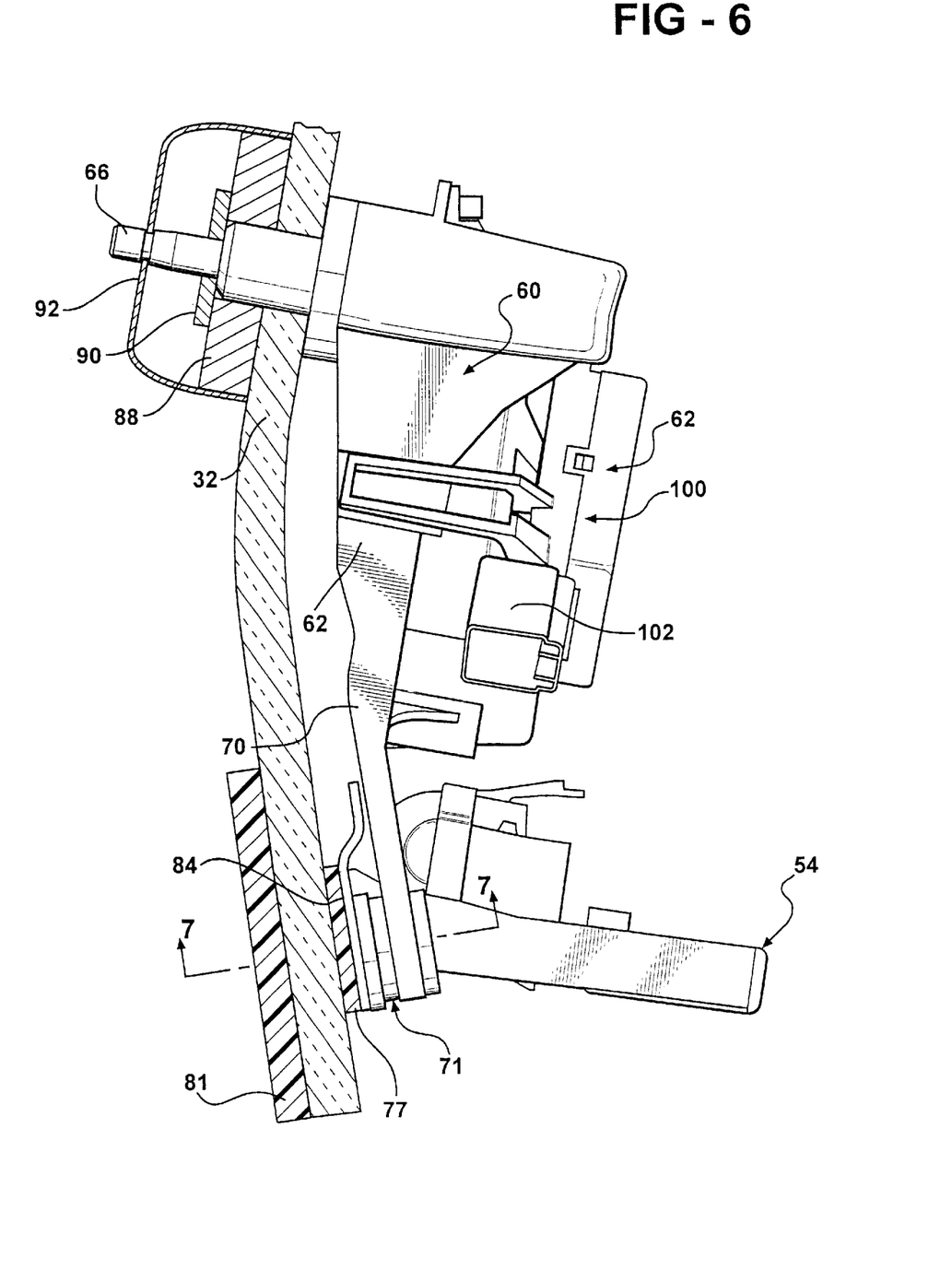
FIG. 6 is a left side elevational view of the module shown in FIG. 4.
Figure 7:
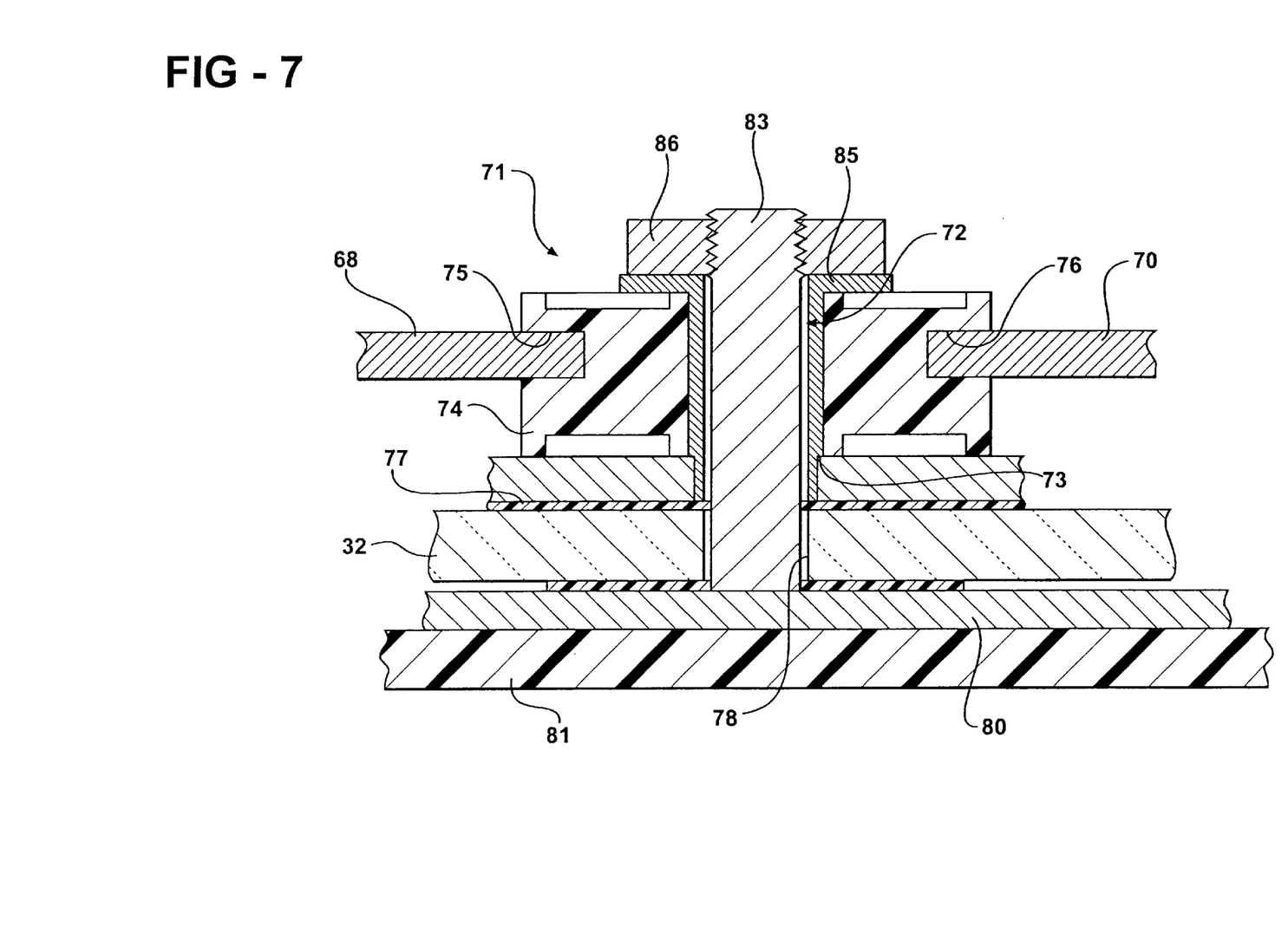
FIG. 7 is a cross-sectional view generally taken along line 7—7 in FIG. 6.

A mount 71 is provided for each of the legs 68 and 70 to connect each of the legs 68 and 70 to mounting plates 82 and 84 as well as to the liftgate glass or window 32 as shown in FIGS. 6 and 7. Each mount 71 includes a spacer means or sleeve 72 having a generally tubular shape with a narrow diameter end forming a shoulder 73. The shoulder 73 is fixedly coupled to one of the mounting plates 82 or 84 by a fixed joint, such as a press fit, a weld, adhesive, etc. Alternately, the sleeve 72 can be integrally formed as a one-piece part of the mounting plate 82 or 84. A flange 85 is formed as an integral part of or fixedly jointed to one end of the sleeve 72. Alternately, the flange 85 can be a separate washer.

A grommet 74 formed of a resilient material, such as rubber, polymer, etc., is mounted about the sleeve 72 and is capured under compression between one of the mounting plate 82 and 84 and the flange 85. The grommet 74 has a pair of opposed recesses 75 and 76, which may also be formed as opposed portions of one continuous annular recess, and which receive an inner edge of the legs 68 and 70 when the grommet 74 is fixedly inserted into a slot between the legs 68 and 70.

As shown in FIG. 7, the mounting plates 82 and 84 are fixedly positioned to the glass 32 with an intermediate resilient gasket 77 interposed therebetween. The grommet 74 thus vibrationally isolates the legs 68 and 70 of the bracket 60 from the mounting plates 82 and 84 and the liftgate glass 32.

As also shown in FIG. 7, a pair of apertures 78, only one of which is shown, are formed in the glass 32 and receive one of a pair of studs 83, each having a threaded end portion. The studs 83 are spacedly mounted on a stud plate 80 which is fixedly secured, such as by overmolding with a trim piece 81.

The studs 83 extend through the apertures 78 in the glass 32 and through the sleeve 72 and receive a fastener, such as a nut 86, to secure the entire mount 71 to the liftgate glass 32.

The upper end of the bracket 60 is fixedly secured to the window 32 by means of a spacer 88, a nut 90 and a cover 92, shown in FIG. 6, which are secured over a threaded portion of the motor output shaft 66.

A wiper arm assembly 78, shown in FIG. 1, is fixedly mounted over the outer end of the motor drive shaft 66 in a conventional manner. The wiper arm assembly normally rests on the outer surface of the liftgate window 32 as also shown in FIG. 1.

The mounting plates 82 and 84 are integrally formed as extensions of the housing of the window latch unit 54. The mounting plates 82 add 84 extend from the main portion of the latch housing and are disposed at an angle to the connector portion of each mounting plate to enable an end portion to wrap around an outer surface of the mounting legs 68 and 70 of the base 62. This enables the window latch unit 54 to be fixedly secured to the mounting bracket 60 by using the same connectors used to attach the lower end of the mounting bracket 60 to the window 32.

The window latch unit can be a flipglass latch sold by Valeo, Model No. 2-3531-824. The latch 54 includes a pivotal claw which is moved between open and closed positions. In the closed position, the claw engages a striker mounted on the liftgate panel adjacent the bottom edge 40 of the liftgate window 32 to pull the bottom end 40 of the window 32 into sealed engagement in a closed position with the liftgate 20. Pivotal movement of the claw in the opposite direction releases the claw from the striker allowing the bottom edge of the liftgate window to be pivoted about the upper hinges to an open position with respect to the liftgate panel.

The housing of the motor unit 52 also supports a controller receptacle 100 which includes a connector or socket 102 for receiving a mating connector for supplying electrical power and activating signals to the motor unit 52 and the window latch 54. The individual connectors from the connector 102 to the motor unit 52 and the window latch 54 can be prewired on the module 50 prior to mounting of the module 50 on the window 52.

Another feature of the module 50 is the provision of connectors, with two connectors 104 and 106 being shown by way of example only, integrally formed on the base 62 of the bracket 60. The receptacles 104 and 106 each contain an aperture 108 which is designed to receive a suitable plug-in snap connector carried on an interior trim panel, not shown, which is mounted over the interior side of the module 50. The interior trim panel also snaps into similar receptacles mounted on strips attached to the inner surface of the window 52. Such additional mounted strips do not form part of the present invention.

In use, the module 50 is assembled as described above to unitarily integrate the wiper motor unit 52 and the window latch unit 54 into the one piece module 50. The mounting bracket includes mounts for connection to mating mounting devices carried on the liftgate window for fixedly securing the module to the liftgate window for movement with the window. The module also includes connections for receiving connectors carried on an inner trim panel which covers an interior bottom surface of the liftgate window to encompass the module.

The use of the present module substantially reduces the assembly of the components on a vehicle liftgate since the module carrying the components is attachable to the liftgate window in a single assembly operation thereby reducing assembly time, the number of workers required, as well as increasing reliability of the individual components which can be preassembled and pretested, if necessary. Further, the module reduces the number of separate electrical connections and mechanical connection point for further manufacturing cost saving and increased reliability of the module mounted components.

What is claimed is:

1. A liftgate component module mountable on a movable liftgate window carried on a vehicle liftgate, the module comprising:
   a unitary bracket;
   a window wiper drive motor and a window latch apparatus mounted on the bracket; and
   means for mounting the bracket to the liftgate window.
2. The module of claim 1 wherein:
   the bracket is formed as an extension of a housing for the wiper drive motor apparatus.
3. The module of claim 1 wherein the bracket comprises:
   first and second spaced legs extending from a portion of the bracket;
   apertures formed in each of the first and second legs; and
   the window latch apparatus having first and second mounting flanges each carrying an aperture, the first and second mounting flanges coupled to the first and second spaced legs, respectively, on the mounting bracket for alignment of the apertures for receiving fasteners carried on the liftgate window therethrough.
4. The module of claim 3 further including:
   dampening members coupled between the first and second apertures in the legs of the mounting bracket and the first and second mounting flanges of the window latch apparatus to vibrationally isolate the first and second legs of the mounting bracket from the window.
5. The module of claim 4 further comprising:
   a hollow sleeve fixedly mounted in each aperture in the first and second mounting flanges, the one dampening member mounted about the sleeve.
6. The module of claim 5 wherein:
   the sleeve is press fit mounted in one of the first and second mounting flanges.
7. The module of claim 4 wherein the dampening members further comprise:
   opposed recess portions, each receiving one of the first and second legs of the bracket.
8. The module of the claim 1 further comprising:
   at least one receptacle for receiving a snap connection carried on an interior trim panel mountable over the module when the module is mounted on the liftgate window.
9. A vehicle liftgate comprising:
   a liftgate panel;
   a pivotal window mounted on the liftgate panel for movement between a first closed position and a second open position;
   a striker carried on the liftgate panel;
   a liftgate window wiper drive apparatus;
   a liftgate window latch apparatus; and
   a bracket, the wiper drive apparatus and the window latch apparatus unitarily mounted to the bracket for unitary one-step mounting on the liftgate window.
10. The module of claim 9 wherein:
    the bracket is formed as an extension of a housing for the wiper motor apparatus.
11. The module of claim 9 wherein the bracket comprises:
    first and second spaced legs extending from a portion of the bracket;
    apertures formed in each of the first and second legs; and
    the window latch apparatus having first and second mounting flanges each carrying an aperture, the first and second mounting flanges coupled to the first and second spaced legs, respectively, on the mounting bracket for alignment of the apertures for receiving fasteners carried on the liftgate window therethrough.
12. The module of claim 11 further including:
    dampening members coupled between the first and second apertures in the legs of the mounting bracket and the first and second mounting flanges of the window latch apparatus to vibrationally isolate the first and second legs of the mounting bracket from the window.
13. The module of claim 12 further comprising:
    spacer means, fixedly coupled to and projecting from each of the first and second mounting flanges, one dampening member mounted about the spacer means.
14. The module of claim 11 wherein the dampening members further comprise:
    opposed recess portions, each receiving one of the first and second legs of the bracket.
15. The module of the claim 6 further comprising:
    at least one receptacle for receiving a snap connection carried on an interior trim panel mountable over the module when the module is mounted on the liftgate window.
16. A method for mounting a plurality of components on a vehicle liftgate comprising the steps of:
    providing a unitary bracket;
    mounting a window wiper drive motor and a liftgate window latch apparatus on the bracket; and
    mounting the bracket on the liftgate window.
17. The method of claim 16 wherein the step of providing a unitary comprises the step of:
    providing the unitary bracket as an extension of a housing for the wiper drive motor.

* * * * *